(12) United States Patent
Bassett et al.

(10) Patent No.: US 10,789,852 B2
(45) Date of Patent: *Sep. 29, 2020

(54) DATA PROCESSING SYSTEM WITH MACHINE LEARNING ENGINE TO PROVIDE ROADSIDE ASSISTANCE FUNCTIONS

(71) Applicant: Allstate Insurance Company, Northbrook, IL (US)

(72) Inventors: Alicia Bassett, Northbrook, IL (US); Christopher J. Lieggi, Schaumburg, IL (US); Chad Allen Balk, Buffalo Grove, IL (US); Matthew Viane, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/857,659

(22) Filed: Apr. 24, 2020

(65) Prior Publication Data
US 2020/0250988 A1    Aug. 6, 2020

Related U.S. Application Data

(63) Continuation of application No. 16/391,958, filed on Apr. 23, 2019.

(Continued)

(51) Int. Cl.
*H04M 11/04* (2006.01)
*G08G 1/00* (2006.01)
(Continued)

(52) U.S. Cl.
CPC ......... *G08G 1/202* (2013.01); *G06F 3/04842* (2013.01); *G06N 20/00* (2019.01); *G08G 1/205* (2013.01); *H04W 4/90* (2018.02)

(58) Field of Classification Search
CPC ......... H04W 4/90; H04W 4/00; H04W 4/023; H04W 4/80; H04W 52/0264;
(Continued)

(56) References Cited

U.S. PATENT DOCUMENTS

2007/0207835 A1    9/2007  Crocker et al.
2014/0309790 A1*  10/2014  Ricci .................. G06F 3/013
                                                      700/276

(Continued)

OTHER PUBLICATIONS

Jul. 29, 2019—(WO) International Search Report and Written Opinion—PCT/US19/28901.

*Primary Examiner* — Joseph Arevalo
(74) *Attorney, Agent, or Firm* — Banner & Witcoff, Ltd.

(57) ABSTRACT

Systems, methods, computer-readable media, and apparatuses for receiving requests for roadside assistance, generating user interfaces and using machine learning to generate roadside assistance instructions are provided. In some examples, a request for roadside assistance may be received. A user and one or more partners may be identified based on the request. In some examples, a profile associated with the user, partner or the like may be identified. A user interface may be generated based on the profile and may include features unique to the profile, partner, or the like. In some arrangements, the interface may include a first portion and a second portion. Selection of an option from the first portion may cause the system to identify data for display in the second portion and cause the data to be displayed in the second portion. Machine learning may be used to determine or identify one or more roadside assistance instructions and a roadside assistance instruction may be generated and executed.

20 Claims, 11 Drawing Sheets

Related U.S. Application Data

(60) Provisional application No. 62/662,345, filed on Apr. 25, 2018.

(51) Int. Cl.
  G06N 20/00 (2019.01)
  H04W 4/90 (2018.01)
  G06F 3/0484 (2013.01)

(58) Field of Classification Search
  CPC ....... H04W 76/50; H04W 8/26; H04W 12/08; H04W 4/025; H04W 4/16; H04W 4/24; H04W 60/00; H04W 80/04; H04W 80/06; H04W 84/042; H04W 84/10; H04W 88/06; H04W 8/02; H04W 8/18
  USPC ........ 455/404.1, 404.2, 557, 466, 99, 553.1, 455/435.1, 411
  See application file for complete search history.

(56) References Cited

U.S. PATENT DOCUMENTS

| | | |
|---|---|---|
| 2015/0324720 A1 | 11/2015 | Briggs et al. |
| 2016/0012465 A1* | 1/2016 | Sharp ................. G06Q 20/10 705/14.17 |
| 2016/0048863 A1* | 2/2016 | Kramer ................ G06Q 30/02 705/14.26 |
| 2016/0076906 A1* | 3/2016 | Hinnegan ............. G01C 21/36 701/408 |
| 2016/0127931 A1* | 5/2016 | Baxley ................. G01S 5/0263 455/67.16 |
| 2017/0221283 A1 | 8/2017 | Pal et al. |
| 2018/0004214 A1* | 1/2018 | Wisniowski ..... G08G 1/096725 |
| 2019/0212164 A1 | 7/2019 | Loebbert |
| 2019/0279447 A1* | 9/2019 | Ricci ..................... B60R 25/25 |
| 2020/0007797 A1* | 1/2020 | Covington .......... G06K 9/00671 |

* cited by examiner

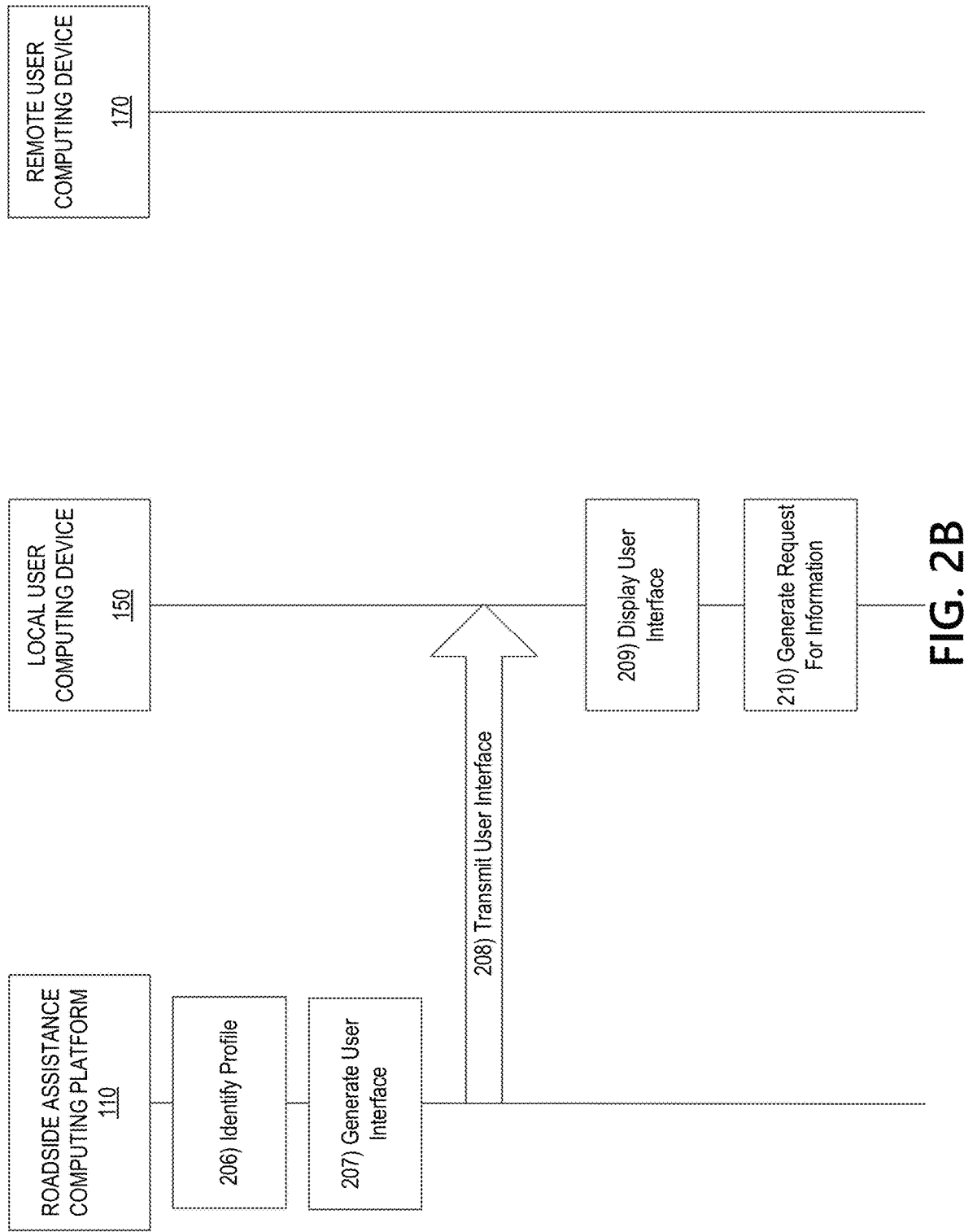

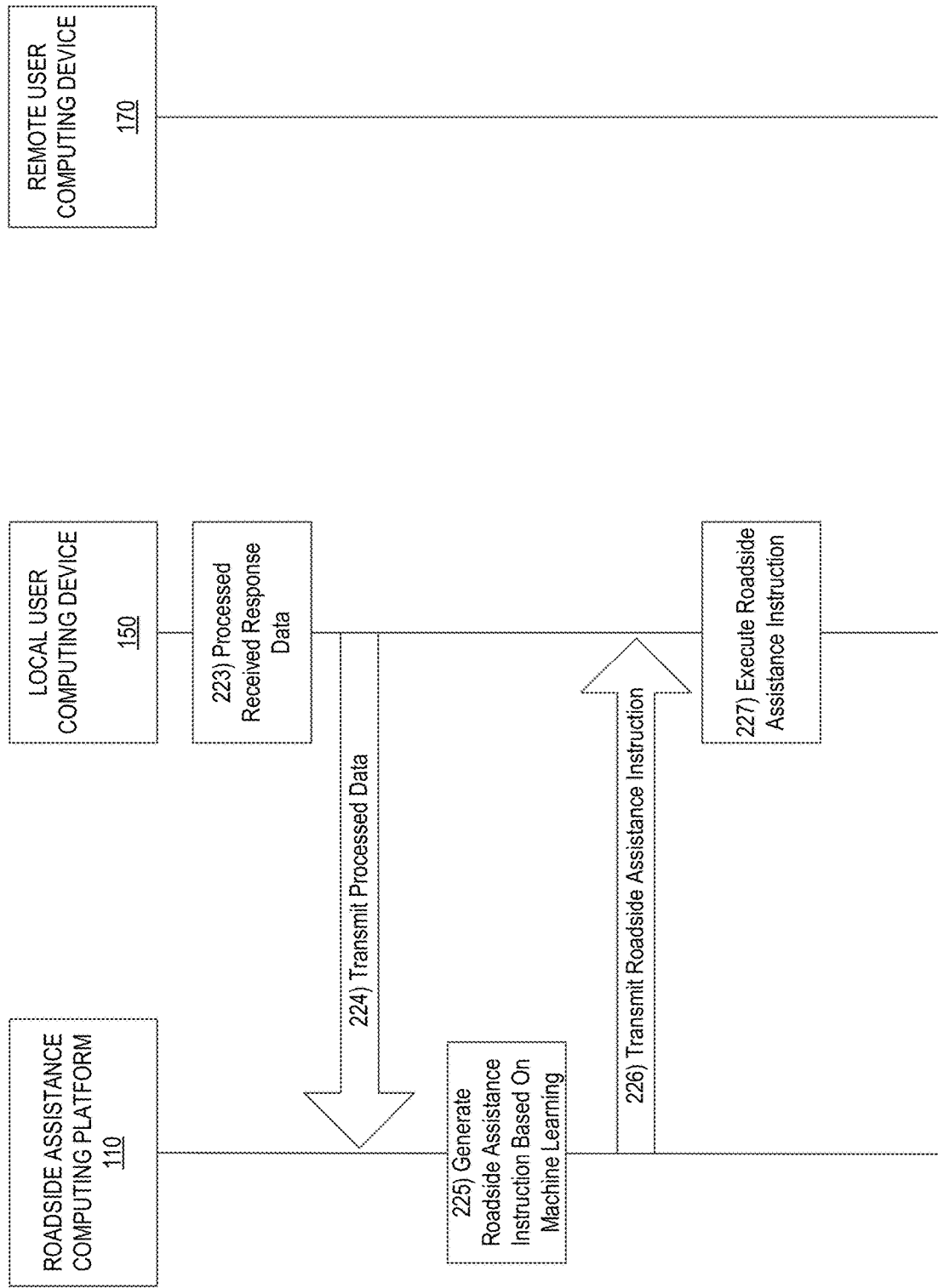

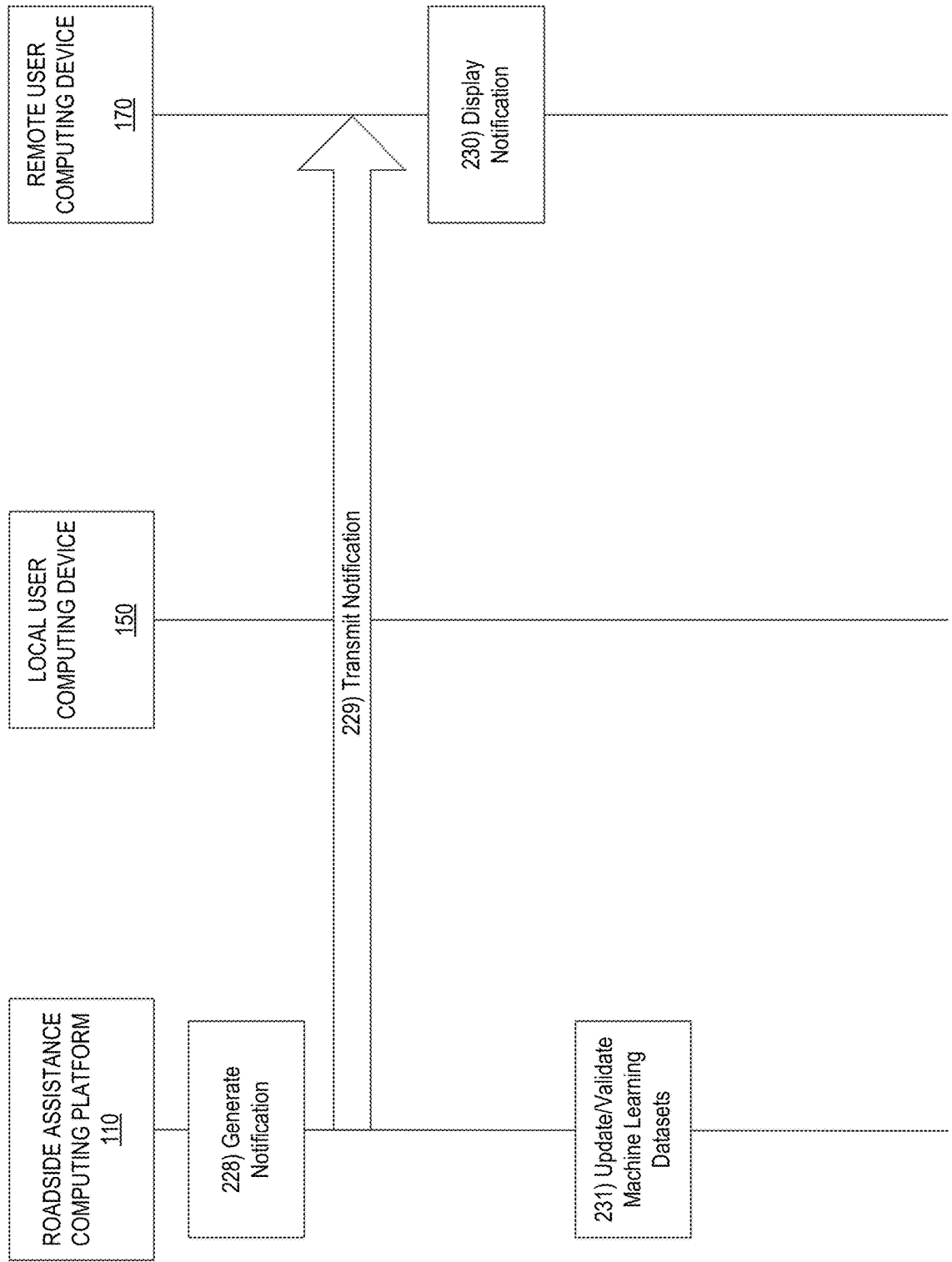

DATA PROCESSING SYSTEM WITH MACHINE LEARNING ENGINE TO PROVIDE ROADSIDE ASSISTANCE FUNCTIONS

CROSS REFERENCE TO RELATED APPLICATIONS

This application is a continuation of and claims priority to co-pending U.S. application Ser. No. 16/391,958, filed Apr. 23, 2019, and entitled "Data Processing System with Machine Learning Engine to Provide Roadside Assistance Functions," which is a non-provisional of and claims priority to U.S. Provisional Application No. 62/662,345, filed Apr. 25, 2018, and entitled "Data Processing System with Machine Learning Engine to Provide Roadside Assistance Functions," both of which are incorporated herein by reference in their entirety.

TECHNICAL FIELD

Aspects of the disclosure generally relate to one or more computer systems, servers, and/or other devices including hardware and/or software. In particular, aspects are directed to processing roadside assistance requests and using machine learning to generate instructions.

BACKGROUND

When a person is having an issue with a vehicle and needs assistance or service, time is of the essence. Even small steps taken to reduce wait time for a user and get the vehicle issue addressed more quickly can make a difference. Conventional roadside assistance systems rely on a roadside assistance associate who may be bound by a script including questions that must be asked in a particular order. The information may then be input into the system in the required order. However, this process can be inefficient and time consuming for the user.

In addition, conventional systems rely on roadside assistance associates to identify and/or dispatch appropriate service providers to address the needs of the user. This is prone to error which can cause further delays.

Accordingly, it would be advantageous to provide a system in which necessary information is captured in an efficient way and machine learning is used to evaluate roadside assistance requests and generate roadside assistance instructions.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, systems, and apparatuses for receiving requests for roadside assistance, generating user interfaces and using machine learning to generate roadside assistance instructions.

In some examples, a request for roadside assistance may be received. In some arrangements, a user may be identified based on the request or information associated with the request. One or more partner entities associated with the user and/or the request may also be identified.

In some examples, a profile associated with the user, partner or the like may be identified. A user interface may be generated based on the profile. In some examples, the user interface may be generated to include features (e.g., data, fields, or the like) unique to the profile, partner, or the like. In some arrangements, the interface may include a first portion and a second portion.

In some arrangements, selection of an option from the first portion may cause the system to identify data for display in the second portion and cause the data to be displayed in the second portion. Machine learning may be used to determine or identify one or more roadside assistance instructions and a roadside assistance instruction may be generated and executed.

These and other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 2A-2F depict an illustrative event sequence for performing roadside assistance functions, according to one or more aspects described herein.

DETAILED DESCRIPTION

Figure 1A:
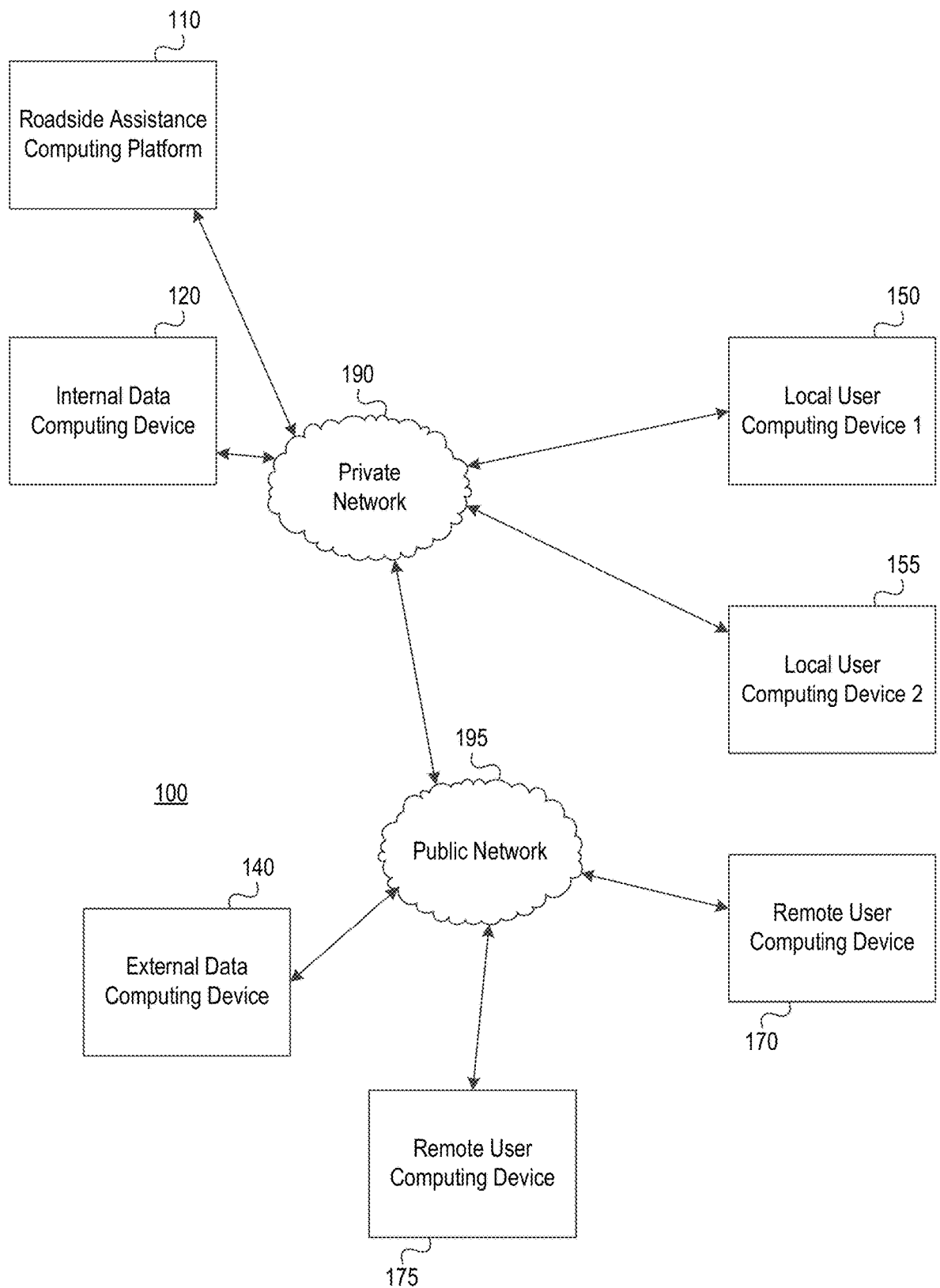
FIGS. 1A and 1B illustrate an illustrative computing environment for implementing roadside assistance functions, according to one or more aspects described herein.

In the following description of the various embodiments, reference is made to the accompanying drawings, which form a part hereof, and in which is shown by way of illustration, various embodiments of the disclosure that may be practiced. It is to be understood that other embodiments may be utilized.

As discussed above, conventional roadside assistance systems often rely on use of a script that requires information to be gathered and/or input in a particular order. This can be time consuming and inefficient. In addition, identification of an appropriate roadside assistance in conventional systems is often performed inefficiently.

Accordingly, aspects described herein are directed to processing requests for roadside assistance. In some examples, a user may be identified based on the request. A partner entity, such as a cellular service provider, vehicle manufacturer, or the like, may also be identified. In some arrangements, a profile may be identified. An interactive user interface may then be generated based on the profile.

In some examples, the user interface may be generated to include data, fields, or the like particular to the profile, partner, or the like. Accordingly, information may be pre-populated based on the profile. This may aid in reducing an amount or type of data to be obtained from the user requesting assistance, may increase accuracy of required equipment, processes, and the like, and may improve efficiency associated with the process.

In some examples, the user interface may include a first portion having a plurality of selectable options, and a second portion. Each option of the plurality of selectable options may be selectable at any time in the process. Accordingly, a user providing information may provide the information in any order and the information may be input in any order, thereby eliminating the inefficiencies associated with requiring entry of information in a particular order found in conventional systems.

Additionally or alternatively, natural language recognition may be used to capture data from the requesting user and input the data into the system. Again, this may improve the efficiency and accuracy with which information is captured.

In some examples, a selection of an option from the first portion may cause the system to identify or determine data for display in the second portion. The data may then be displayed in the second portion. In some examples, some data may be pre-populated while other data may be input by a user.

Once data associated with the request has been captured, machine learning may be used to generate a roadside assistance instruction. The roadside assistance instruction may include a particular provider, type of equipment, or the like, to provide the requested service. For instance, the system may evaluate the location of a user, determine that the user is in a parking garage having vehicle height restrictions and may identify and dispatch an appropriate vehicle meeting the height requirements, based on a machine learning output.

These and other aspects will be described more fully herein.

Figure 1B:
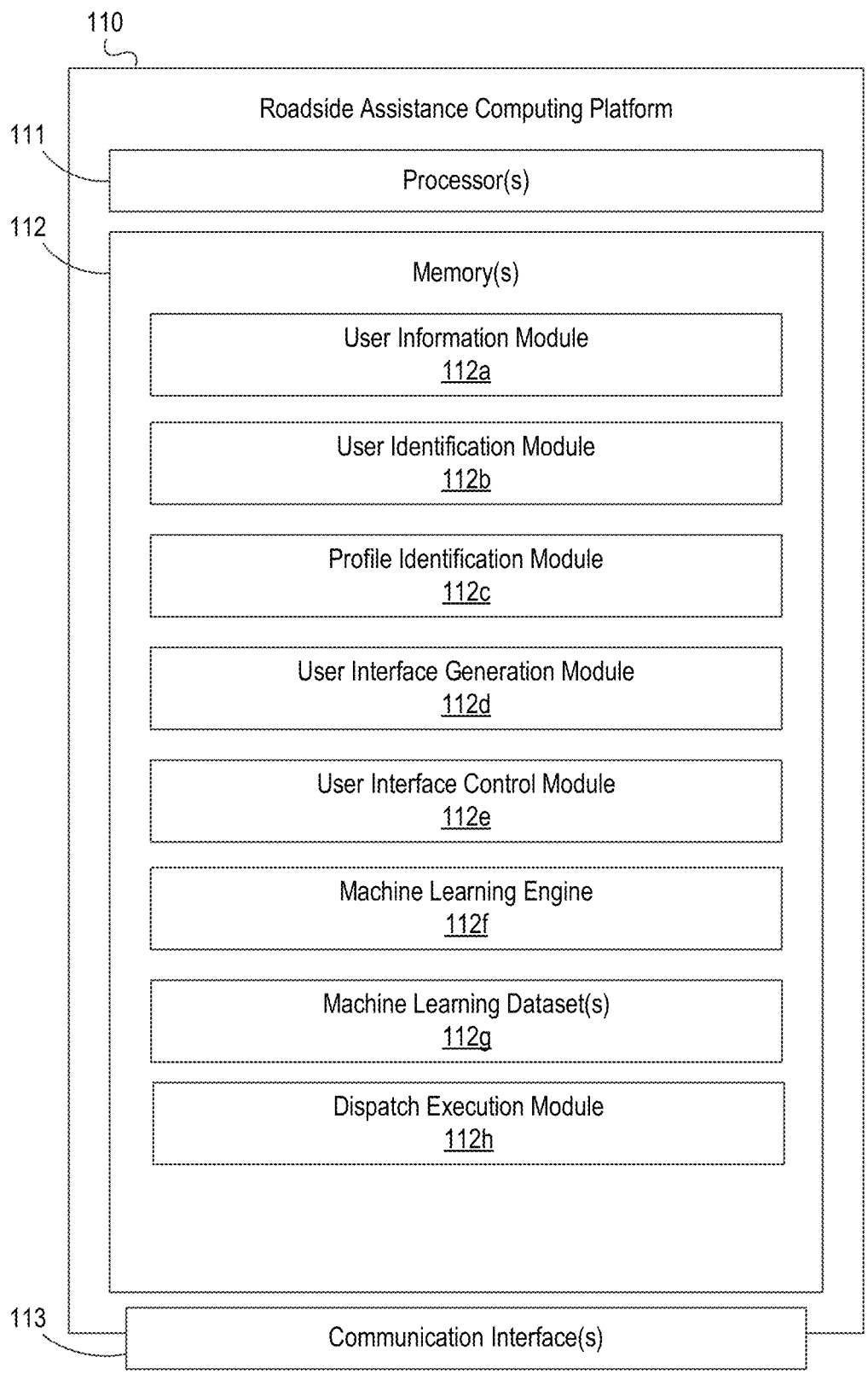

FIGS. 1A-1B depict an illustrative computing environment for implementing and using a roadside assistance control system in accordance with one or more aspects described herein. Referring to FIG. 1A, computing environment 100 may include one or more computing devices and/or other computing systems. For example, computing environment 100 may include a roadside assistance computing platform 110, an internal data computing device 120, a first local user computing device 150, a second local user computing device 155, an external data computing device 140, a remote user computing device 170, and a remote user computing device 175.

Roadside assistance computing platform 110 may be configured to host and/or execute one or more modules including instructions for providing various roadside assistance request evaluation and execution functions. In some examples, roadside assistance computing platform 110 may be configured to receive a request for roadside assistance, identify a user associated with the request, identify a partner entity associated with the user or the request, and generate an interactive user interface based on the identified information. In some examples, the generated user interface may be particular to an identified partner or profile of the identified partner.

In some examples, the roadside assistance computing platform 110 may generate a multi-part user interface. For instance, the user interface may include a first portion and a second portion. In some examples, the first portion may include a plurality of selectable options. In some arrangements, the selectable options presented may be based on the identified partner or partner profile. Further, the second portion may be populated based on selection of one selectable option from the first portion. In some arrangements, the plurality of selectable options in the first portion may be selected for inputting additional information related to the roadside assistance request in any order.

In some arrangements, information related to the roadside assistance request may be input into the roadside assistance computing platform 110 and a roadside assistance response may be generated and/or executed. For instance, in some examples, one or more machine learning datasets may be used to identify an appropriate piece of equipment to dispatch, identify a service provider, and the like.

Internal data computing device 120 may have, store and/or include data associated with or obtained by an entity implementing the roadside assistance computing platform 110 and/or stored by the entity. In some examples, internal data computing device 120 may include data associated with customers, one or more insurance claims, accident histories and associated damages, costs, etc., user information, and the like. In some examples, internal data computing device 120 may include multiple computing devices storing various different types of data. In other examples, internal data computing device 120 may store the various types of data. In still other examples, internal data computing device 120 may query databases in one or more other computing devices, systems, or the like, to obtain data that may be used in one or more processes described herein.

External data computing device 140 may have, store and/or include data from outside of or external to the entity. For instance, external data computing device 140 may store or provide access to publicly available information, such as weather, traffic, population, demographic information, and the like. In some examples, external data computing device 140 may access information from various sources, such as via public network 195.

Local user computing device 150 and local user computing device 155 may be computing devices associated with an entity implementing or operating the roadside assistance computing platform 110. For instance, local user computing device 150, 155 may be computing devices used by roadside assistance associates to receive roadside assistance requests, process requests, execute instructions associated with roadside assistance requests, and the like.

Remote user computing device 170 and remote user computing device 175 may be computing devices not associated with the entity implementing or operating the roadside assistance computing platform 110 (e.g., owned by a customer, service provider, vendor, or the like, rather than the entity). Remote user computing device 170, 175 may be computing devices associated with a user requesting roadside assistance (e.g., a mobile device of a user), with a roadside assistance service provider (e.g., a service center computing device), or the like.

Local user computing device 150, 155, internal data computing system 120, external data computing system 140, remote user computing device 170, and remote user computing device 175 may be configured to communicate with and/or connect to one or more computing devices or systems shown in FIG. 1A. For instance, local user computing device 150, 155 and/or internal data computing device 120 may communicate with one or more computing systems or devices via network 190, while remote user computing device 170, remote user computing device 175, and/or external data computing device 140 may communicate with one or more computing systems or devices via network 195.

In one or more arrangements, internal data computing device 120, local user computing device 150, local user computing device 155, external data computing device 140, remote user mobile computing device 170, and/or remote user computing device 175 may be any type of computing device or combination of devices capable of performing the particular functions described herein. For example, internal data computing device 120, local user computing device 150, local user computing device 155, external data computing device 140, remote user mobile computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of roadside assistance computing platform 110, internal data computing device 120, local user computing device 150, local user computing device 155, external data computing device 140, remote user computing device 170, and/or remote user computing device 175 may, in some instances, be or include special-purpose computing devices configured to perform specific functions.

Computing environment 100 also may include one or more computing platforms. For example, and as noted above, computing environment 100 may include roadside assistance computing platform 110. As illustrated in greater detail below, roadside assistance computing platform 110 may include one or more computing devices configured to perform one or more of the functions described herein. For example, roadside assistance computing platform 110 may have or include one or more computers (e.g., laptop computers, desktop computers, tablet computers, servers, server blades, or the like).

As mentioned above, computing environment 100 also may include one or more networks, which may interconnect one or more of roadside assistance computing platform 110, internal data computing device 120, local user computing device 150, local user computing device 155, external data computing device 140, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, roadside assistance computing platform 110, internal data computing device 120, local user computing device 150, and/or local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect roadside assistance computing platform 110, internal data computing device 120, local user computing device 150, and/or local user computing device 155, and one or more other computing devices and/or computer systems that are used by, operated by, and/or otherwise associated with the organization. Public network 195 may connect private network 190 and/or one or more computing devices connected thereto (e.g., roadside assistance computing platform 110, internal data computing device 120, local user computing device 150, local user computing device 155) with one or more networks and/or computing devices that are not associated with the organization. For example, external data computing device 140, remote user computing device 170, and/or remote user computing device 175 might not be associated with an organization that operates private network 190 (e.g., because external data computing device 140, remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the internet) that connect external data computing device 140, remote user computing device 170 and remote user computing device 175 to private network 190 and/or one or more computing devices connected thereto (e.g., roadside assistance computing platform 110, internal data computing device 120, local user computing device 150, and/or local user computing device 155).

Referring to FIG. 1B, roadside assistance computing platform 110 may include one or more processors 111, memory 112, and communication interface 113. A data bus may interconnect processor(s) 111, memory 112, and communication interface 113. Communication interface 113 may be a network interface configured to support communication between roadside assistance computing platform 110 and one or more networks (e.g., private network 190, public network 195, or the like). Memory 112 may include one or more program modules having instructions that when executed by processor(s) 111 cause roadside assistance computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of roadside assistance computing platform 110 and/or by different computing devices that may form and/or otherwise make up roadside assistance computing platform 110.

For example, memory 112 may have, store, and/or include a user information module 112*a*. The user information module 112*a* may store instructions and/or data that may cause or enable the roadside assistance computing platform 110 to receive information from a user requesting roadside assistance. In some examples, the data may be received via a roadside assistance associate who may, in some examples, input the data via one or more user interfaces. In other examples, the information may be provided by a user requesting roadside assistance and may be extracted using natural language recognition. In other examples, the information may be input to a user computing device, such as remote user computing device 170, 175, and may be transmitted to the roadside assistance computing platform 110.

Roadside assistance computing platform 110 may further have, store and/or include a user identification module 112*b*. User identification module 112*b* may store instructions and/or data that may cause or enable the roadside assistance computing platform 110 to evaluate the received user information and identify a user and user profile associated with the user information. For instance, a user may pre-register with the roadside assistance computing platform 110, or application executing on the remote user computing device 170, 175 associated with the roadside assistance computing platform 110 and may store information such as name, contact information, vehicle information (e.g., make, model, etc.), one or more partner entities or providers (e.g., insurance providers, cell service providers, or the like). This information may be store and may be extracted based on the received user information associated with the roadside assistance request.

Roadside assistance computing platform 110 may further have, store and/or include a profile identification module 112c. Profile identification module 112c may include instructions and/or data that may cause or enable the roadside assistance computing platform 110 to identify a profile associated with the requesting user and one or more partner entities associated with the user. The profile may include data for pre-populating one or more portions of an interactive user interface, may identify known and unknown information associated with the user, may identify coverages or other services available to the user, and the like.

Roadside assistance computing platform 110 may further have, store and/or include user interface generation module 112d. User interface generation module 112d may include instructions and/or data that may cause or enable the roadside assistance computing platform 110 to generate one or more interactive user interfaces based on the identified profile. For instance, a user interface may be generated that is specific to a user profile, partner entity, or the like. Generating the user interface may include generating an interface with one or more fields particular to the user or partner entity. In some examples, generating the user interface may include pre-populating one or more fields based on the profile, user or partner entity. In some examples, the generating user interface may include a first portion and a second portion. In some examples, the first portion may include a plurality of user selectable options based on the profile. Selection of an option from the first portion may cause the second portion to populate. In some examples, the information populating the second portion may be based, at least in part, on the identified profile.

Roadside assistance computing platform 110 may further have, store and/or include a user interface control module 112e. User interface control module 112e may store instruction and/or data that may cause or enable the roadside assistance computing platform 110 to control aspects of a user interface. For instance, as discussed above, selection of one option from the plurality of selectable options in the first portion may cause the second portion to populate. In some examples, user interface control module 112e may evaluate selections made from the first portion, may identify fields for display in the second portion, may identify data for pre-population in the second portion, may generate and/or execute instructions to display the second portion, and the like.

Roadside assistance computing platform 110 may further have, store and/or include a machine learning engine 112f and machine learning datasets 112g. Machine learning engine 112f and machine learning datasets 112g may store instructions and/or data that cause or enable roadside assistance computing platform 110 to evaluate data, as data received from the user related to the roadside assistance issue, data from one or more other sources, such as internal data computing device 120, external data computing device 140, and the like, and generate one or more roadside assistance recommendation outputs. The machine learning datasets 112g may be generated based on analyzed data (e.g., data from previously received roadside assistance requests, historical data, and the like), raw data, and/or received from one or more outside sources.

The machine learning engine 112f may receive data (e.g., data from a user in a roadside assistance request, internal data computing device 120, external data computing device 140, and the like) and, using one or more machine learning algorithms, may generate one or more machine learning datasets 112g. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112f may analyze data to identify patterns of activity, sequences of activity, and the like, to generate one or more machine learning datasets 112g.

The machine learning datasets 112g may include machine learning data linking one or more outcomes of a roadside assistance request to one or more outputs. For instance, data may be used to generate one or more machine learning datasets 112g linking data from certain types of services requests, particular locations, particular vehicle data and specifications, and the like, to a particular type of equipment needed, a particular service provider to dispatch, or the like. This information may be used to efficiently generate roadside assistance instructions, execute instructions and dispatch service providers to address roadside assistance requests.

The machine learning datasets 112g may be updated and/or validated based on later-received data. For instance, as additional data collected from subsequent roadside assistance requests may be used to validate and/or update the machine learning datasets 112g based on the newly received information. Accordingly, the system may continuously refine determinations, outputs, and the like.

The machine learning datasets 112g may be used by, for example, a dispatch execution module 112h stored or included in memory 112. The dispatch execution module 112h may store instructions and/or data configured to cause or enable the roadside assistance computing platform 110 to generate one or more instructions related to roadside assistance resolution, transmit the one or more instructions to one or more devices, and execute the instructions, thereby causing a service provider to dispatch a roadside assistance provider to address the request for roadside assistance.

FIGS. 2A-2F illustrate one example event sequence for performing roadside assistance control functions in accordance with one or more aspects described herein. The sequence illustrated in FIGS. 2A-2F is merely one example sequence and various other events may be included, or events shown may be omitted, without departing from the invention.

Figure 2A:
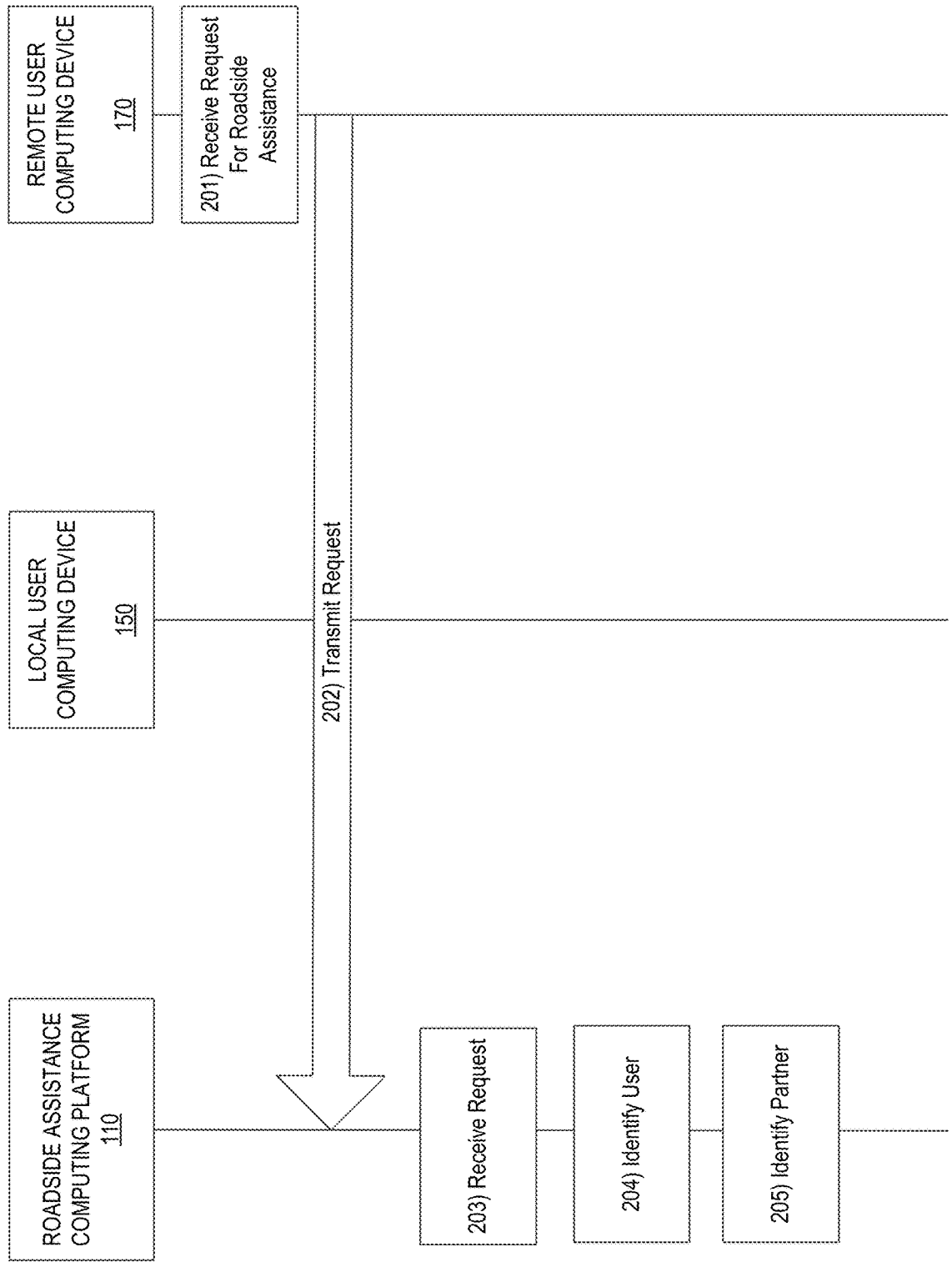

With reference to FIG. 2A, in step 201, a request for roadside assistance may be received. In some examples, the request may be received via a remote user computing device 170. For instance, the request may be received via a mobile device of a user. In some examples, the request for roadside assistance may be made via an application downloaded to the remote user computing device 170 and executing on the remote user computing device 170. In other examples, the request may be made via a telephone call to a roadside assistance phone number.

At step 202, the request may be transmitted to the roadside assistance computing platform 110. At step 203, the request may be received by the roadside assistance computing platform 110 and may be processed.

At step 204, a user associated with the request may be identified. For instance, a name of a user may be extracted from the roadside assistance request. In another example, a unique identifier associated with the remote user computing device 170 may be extracted from the request for roadside assistance and may be used to identify a user associated with the remote user computing device 170.

At step 205, one or more partner entities may be identified. For instance, based on one or more of the user requesting roadside assistance, a channel through which the request was received, a type of request, or the like, one or more partner entities may be identified. Partner entities may include insurance provider, cellular service providers, vehicle manufacturer, and the like.

With reference to FIG. 2B, at step 206, a profile associated with the user and/or the identified partner may be identified. The profile may include unique requirements, criteria, services, or the like, associated with the partner or user. In step 207, the identified profile may be used to generate an interactive user interface. For instance, the user interface may be generated based on requirements, fields, known or predetermined data, and the like, associated with the profile. Accordingly, the user interface generated may be specific to the profile, partner, or the like. In some examples, the user interface may have more than one portion (e.g., a first portion and a second portion). In some examples, some or all of each portion may be pre-populated with data associated with the user, vehicle, request for assistance, and the like.

At step 208, the generated user interface may be transmitted local user computing device 150. For instance, the generated user interface may be transmitted to a roadside assistance associate computing device. At step 209, the generated user interface may be displayed on the local user computing device 150. The user interface may then be used to input additional information related to the roadside assistance request, user, and the like.

At step 210, a first request for additional information may be generated. For instance, based on the generated user interface, a first request for additional information may be generated.

Figure 2C:
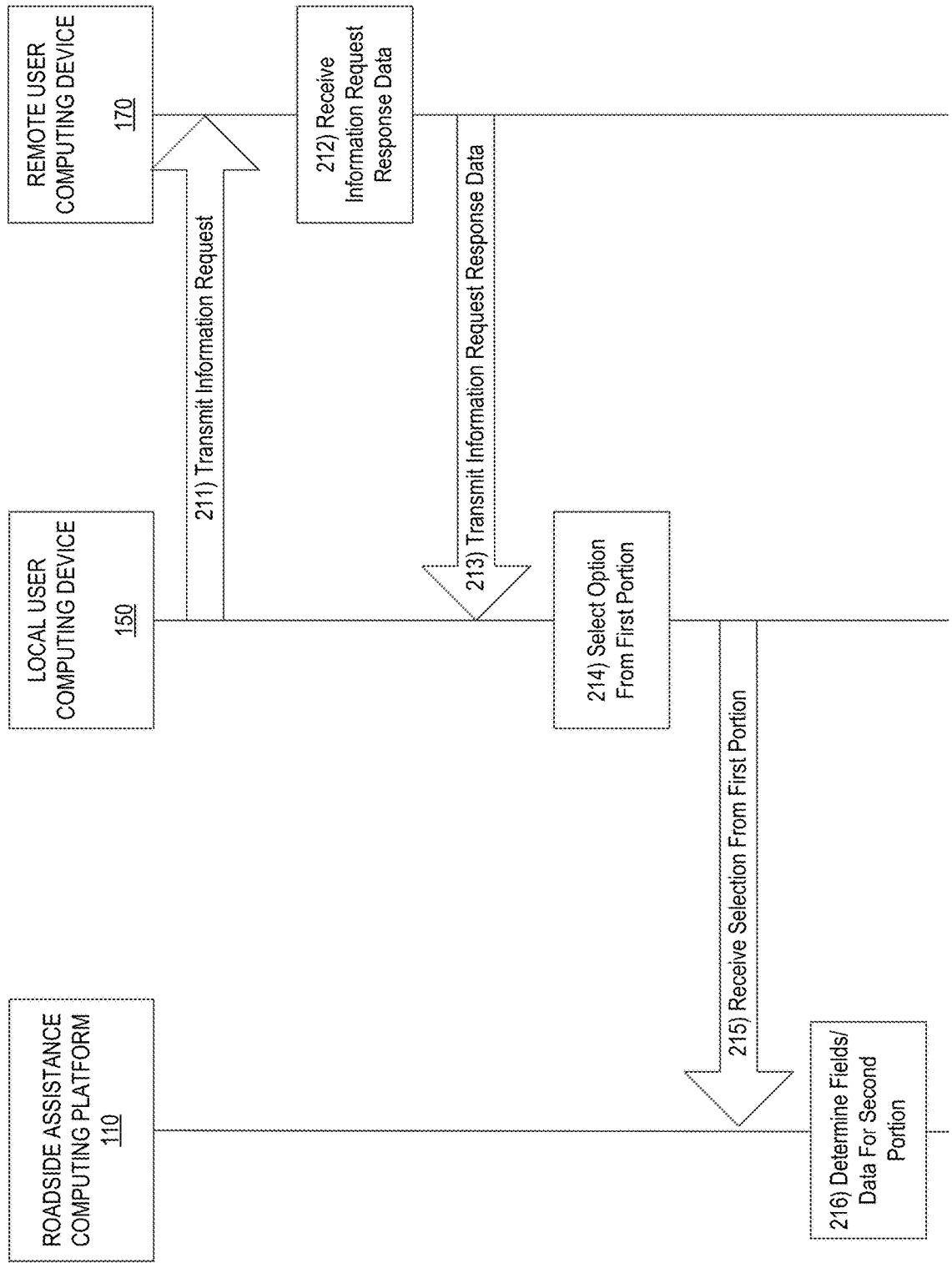

With reference to FIG. 2C, at step 211, the first request for additional information may be transmitted to the remote user computing device 170. At step 212, first additional information request response data may be received by the remote user computing device. For instance, the first request for additional information may include a request for additional details related to the request for roadside assistance. Accordingly, the first additional information request response data may include additional details associated with the problem, or the like. In some examples, the first request for additional information response data may include location information based on global positioning system (GPS) data captured by the remote user computing device 170.

At step 213, the first additional information request response data may be transmitted to the local user computing device 150. In response to receiving the first additional information request response data, a first option from a plurality of selectable options in a first portion of the user interface may be selected in step 214. At step 215, the selected first option may be transmitted to the roadside assistance computing platform 110.

At step 216, the selection of the first option may be received by the roadside assistance computing platform 110 and may be processed. Processing the selection may include identifying data (e.g., information, fields, and the like) to display in a second portion of the generated user interface.

Figure 2D:
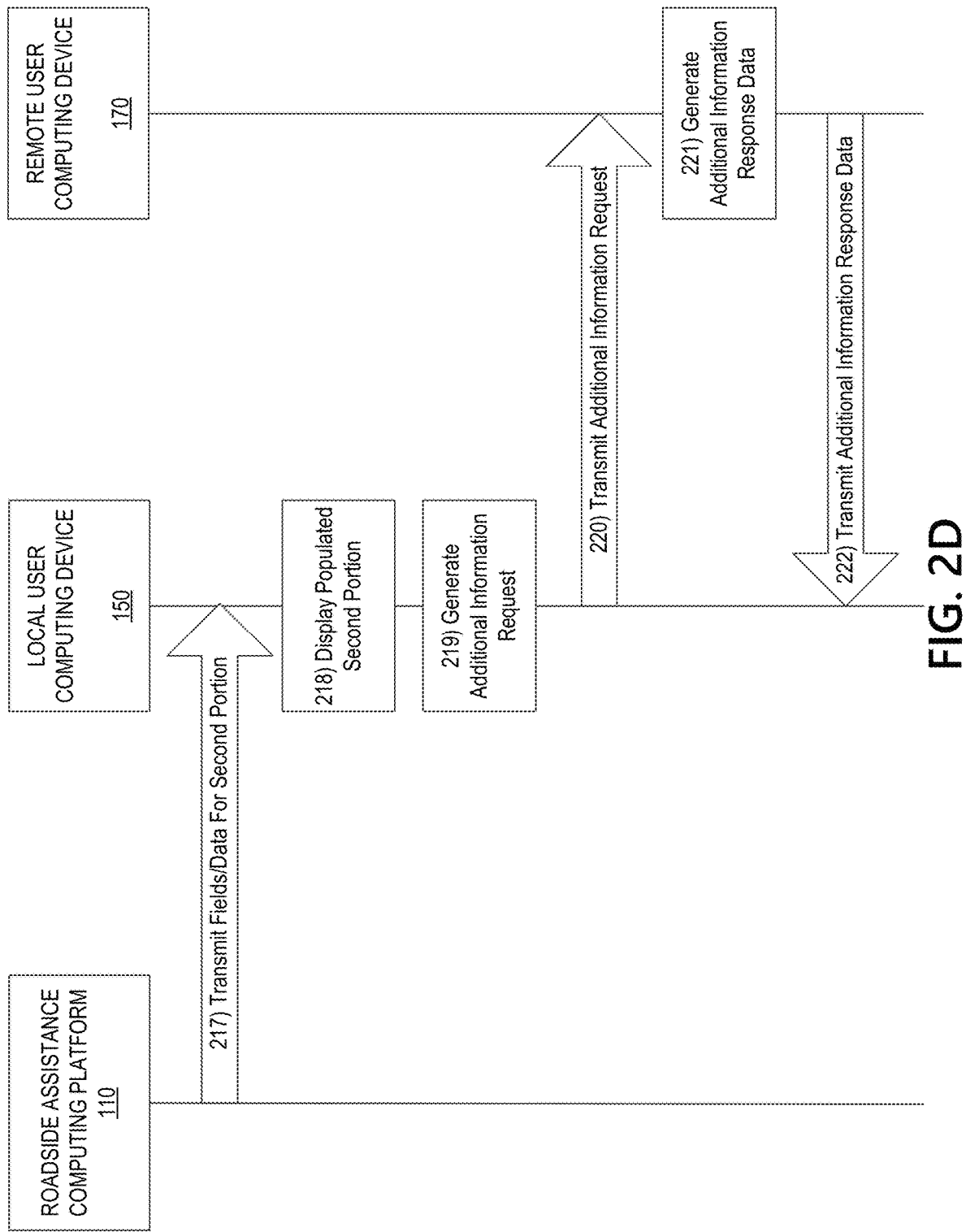

With reference to FIG. 2D, at step 217, the identified data (e.g., information, fields, and the like) may be transmitted to local user computing device 150. At step 218, the second portion of the user interface may be populated with the data transmitted in step 217 and may be displayed on the local user computing device 150.

At step 219, a second request for additional information may be generated by local user computing device 150. The second request for additional information may be generated based on the information displayed in the second portion of the user interface. For instance, if a user requests roadside assistance and the first request for additional information response data includes an indication that the vehicle has a flat tire, a second request for additional information may include a request for information related to which tire, whether the vehicle includes a spare, and the like.

At step 220, the second request for additional information may be transmitted to the remote user computing device 170. At step 221, second request for additional information response data may be received by the remote user computing device 170 and may be transmitted to local user computing device 150 at step 222.

With reference to FIG. 2E, at step 223, the received second request for additional information response data may be processed and, at step 224, the processed data may be transmitted to the roadside assistance computing platform 110.

At step 225, one or more machine learning datasets may be used to identify a roadside assistance instruction or output based on the received information, processed information, and the like, related to the request. For instance, based on the received information, the machine learning datasets may be used to identify a type of assistance, particular pieces of equipment needed (e.g., tow truck vs. flatbed, or the like), a preferred roadside assistance provider, and the like. At step 226, the generated instruction may be transmitted to the local user computing device 150. At step 227, the instruction may be received and executed by the local user computing device 150. In some examples, executing the instruction may include generating and transmitting a command, instruction, or signal to a remote user computing device, such as a roadside assistance provider computing device, to dispatch a particular provider.

With reference to FIG. 2F, at step 228, a notification related to the roadside assistance instruction may be generated. For instance, an estimated time of arrival, name of the roadside assistance provider, and the like may be provided in a notification. At step 229, the notification may be transmitted to the remote user computing device 170. At step 230, the notification may be displayed on the remote user computing device 170.

At step 231, one or more machine learning datasets may be updated or validated. For instance, based on the generated instruction, information received associated with the request, processed information, and the like, one or more machine learning datasets may be updated and/or validated.

Figure 3:
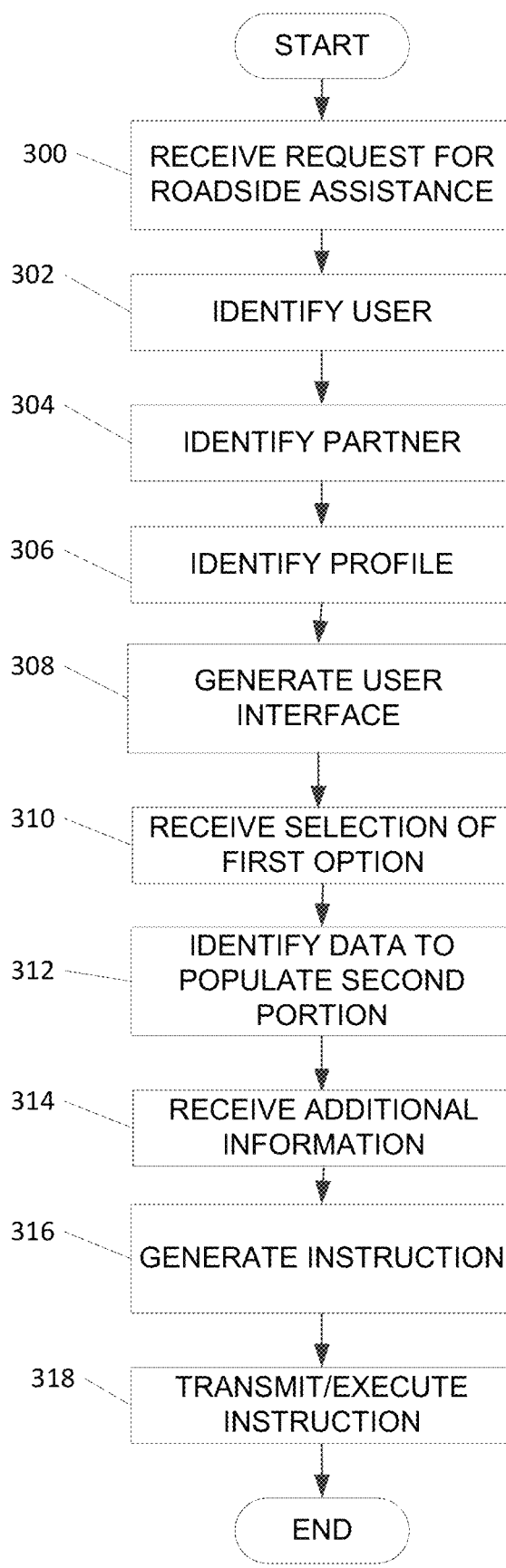
FIG. 3 illustrates one example flow chart illustrating an example method of executing roadside assistance control functions, according to one or more aspects described herein.

FIG. 3 illustrates one example process for evaluating roadside assistance requests and generating and executing roadside assistance instructions according to one or more aspects described herein. The steps described with respect to FIG. 3 may be performed by one or more of the various devices described herein, such as the roadside assistance computing platform 110, and the like. In some examples, one or more of the processes or steps described may be performed in real-time or near real-time.

In step 300, a request for roadside assistance may be received. As discussed herein, the request may be received from a remote user computing device 170. At step 302, a user associated with the request may be identified. For example, a user name may be extracted from information provided via the request. In another example, a unique identifier associated with the device from which the request was received may be used to identify the user associated with the device.

At step 304, a partner entity may be identified. In some examples, a partner entity may be a cellular service provider, vehicle manufacturer, insurance provider, or the like. The partner may be identified based on the identity of the user (e.g., the user may be associated with one or more partner entities), based on vehicle information associated with the user, based on parameters or characteristics of the received request (e.g., provider through which a request was received), or the like.

At step 306, a profile may be identified. The profile may be based on the user, partner, or the like. In step 308, a user interface may be generated. In some examples, the user interface may be generated based on the identified profile. For instance, the user interface may have features, aspects, fields, data, layout, or the like that is particular to a profile (e.g., based on the user, partner, or the like). In some examples, the generated user interface may include a first portion having a plurality of selectable options and a second portions. In some arrangements, when the user interface is generated in step 308, the first portion may be populated while the second portion may remain unpopulated (e.g., only the first portion may be populated with data).

At step 310, selection of a first option from the plurality of selectable options in the first portion of the user interface may be received. In some examples, any option of the plurality of selectable options, may be selected. For instance, the options may be selected in any order, without order (e.g., randomly), or the like, without negatively impacting the process of generating the roadside assistance instruction, identifying data for display in the second portion, or the like.

The selection may be processed and, in step 312, data to populate the second portion of the user interface may be identified. For instance, particular fields, pieces of information, and the like, may be identified for display in the second portion of the user interface. The identified information may be transmitted and displayed in the user interface.

At step 314, additional information may be received. For instance, additional details related to the roadside assistance request may be received. This information may be processed and, in step 316, one or more machine learning datasets may be used to generate a roadside assistance instruction. For instance, one or more machine learning datasets may be used to generate a roadside assistance instruction based on the roadside assistance request, received additional information, processed information, and the like. At step 318, the generated instruction may be transmitted to a computing device and executed on the device.

Figure 4A:
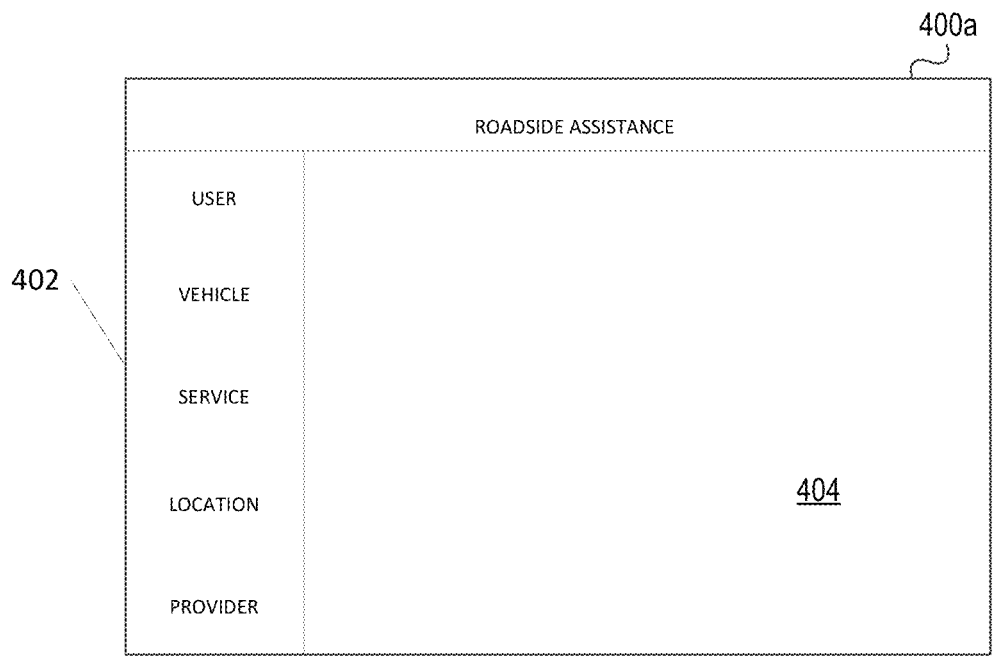
FIGS. 4A and 4B illustrate example user interfaces for capturing roadside assistance request information and displaying generated recommendations, according to one or more aspects described herein.
Figure 4B:
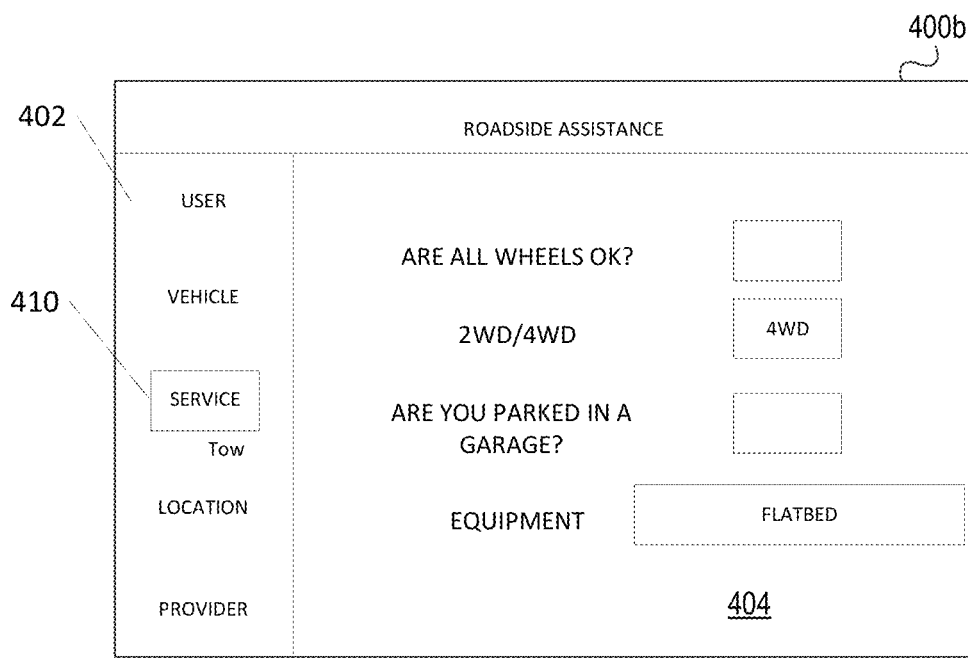

FIGS. 4A and 4B illustrate an example user interface that may be generated in accordance with one or more aspects described herein. As shown in FIGS. 4A and 4B, the interface 400 may include two portions, a first portion 402 and a second portion 404. As shown in FIG. 4A, interface 400a includes only the first portion populated. The first portion includes a plurality of selectable options that may be selected in any order.

FIG. 4B illustrates the user interface 400b after a selection has been made from the first portion. In the example shown, option 410 has been selected from the first portion. Selection of option 410 may cause the second portion 404 to populate with particular fields, data, and the like. In some examples, information may be pre-populated (e.g., that the vehicle is 4 wheel drive). Additionally or alternatively, machine learning may be used to generate a recommendation for service. In the example of interface 400b, one or more machine learning datasets are used to determine that a flatbed truck will be necessary to service the vehicle.

Figure 5:
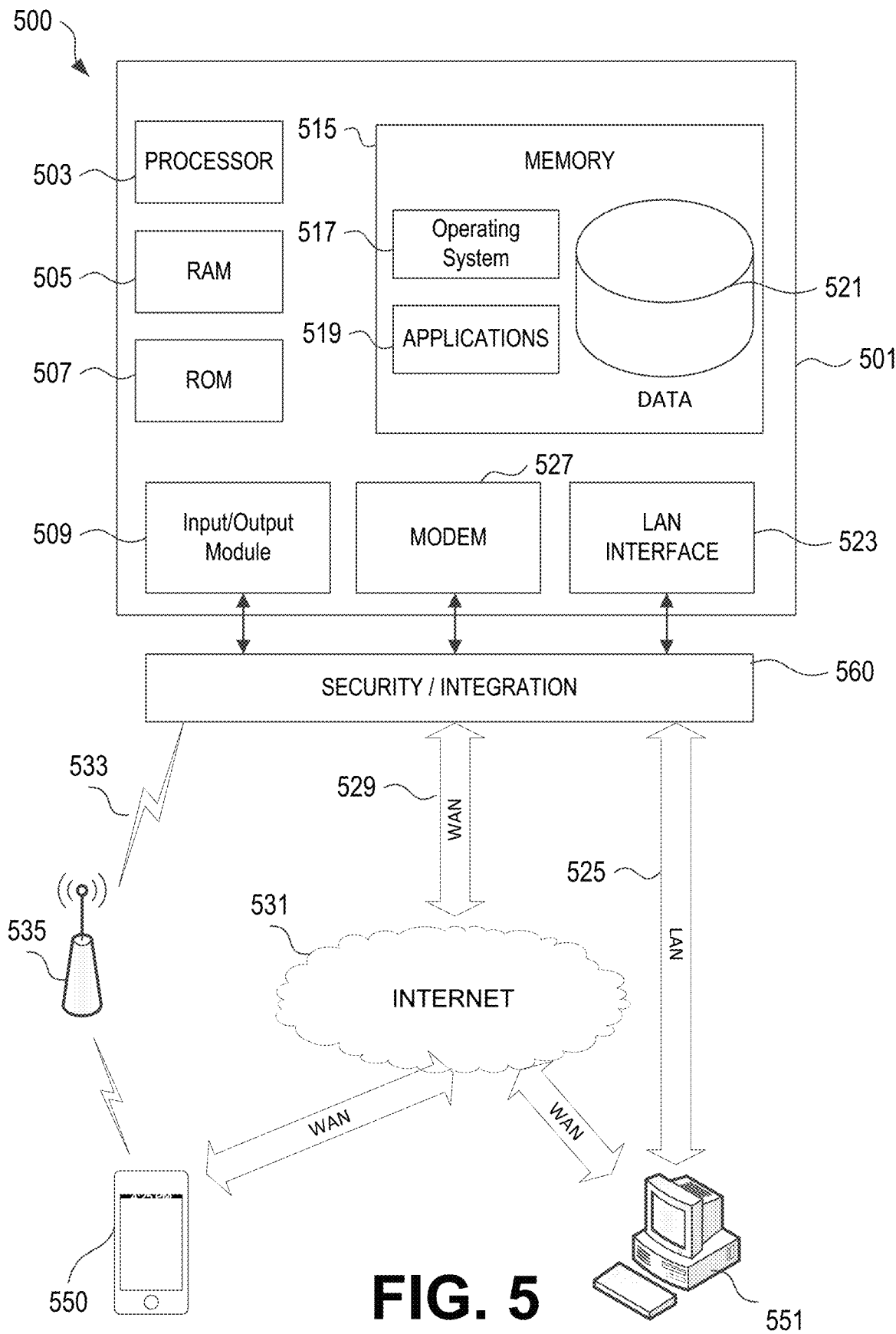
FIG. 5 illustrates a network environment and computing systems that may be used to implement aspects of the disclosure.

FIG. 5 illustrates a block diagram of a computing device (or system) 501 in a computer system 500 that may be used according to one or more illustrative embodiments of the disclosure. The computing device 501 may have a processor 503 for controlling overall operation of the computing device 501 and its associated components, including RAM 505, ROM 507, input/output module 509, and memory 515. The computing device 501, along with one or more additional devices (e.g., terminals 550 and 551, security and integration hardware 560) may correspond to any of multiple systems or devices, such as a user personal mobile computing device, computing platform, or a computer server, configured as described herein for receiving requests for roadside assistance, generating requests for additional information, hosting a machine learning engine to generate roadside assistance instructions, generate user interfaces, and the like.

Input/Output (I/O) 509 may include a microphone, keypad, touch screen, and/or stylus through which a user of the computing device 501 may provide input, and may also include one or more of a speaker for providing audio output and a video display device for providing textual, audiovisual and/or graphical output. Software may be stored within memory 515 and/or storage to provide instructions to processor 503 for enabling computing device 501 to perform various actions. For example, memory 515 may store software used by the computing device 501, such as an operating system 517, application programs 519, and an associated internal database 521. The various hardware memory units in memory 515 may include volatile and nonvolatile, removable and non-removable media implemented in any method or technology for storage of information such as computer readable instructions, data structures, program modules or other data. Certain devices/systems within roadside assistance computing system may have minimum hardware requirements in order to support sufficient storage capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 501 (e.g., a mobile computing device 501, roadside assistance computing platform 501, etc.), in order to store and execute roadside assistance control applications, receive requests for roadside assistance, generate roadside assistance instructions, execute instructions, generate user interfaces, etc. Memory 515 also may include one or more physical persistent memory devices and/or one or more non-persistent memory devices. Memory 515 may include, but is not limited to, random access memory (RAM) 505, read only memory (ROM) 507, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 503.

Processor 503 may include a single central processing unit (CPU), which may be a single-core or multi-core processor (e.g., dual-core, quad-core, etc.), or may include multiple CPUs. Processor(s) 503 may have various bit sizes (e.g., 16-bit, 32-bit, 64-bit, 96-bit, 128-bit, etc.) and various processor speeds (ranging from 100 MHz to 5 Ghz or faster). Processor(s) 503 and its associated components may allow the system 501 to execute a series of computer-readable instructions, for example, receive requests for roadside assistance, generate requests for additional information, generate user interfaces, use machine learning to generate roadside assistance instructions, execute roadside assistance instructions, and the like.

The computing device (e.g., a mobile computing device, computing platform, server, external server, etc.) may operate in a networked environment 500 supporting connections to one or more remote computers, such as terminals 550 and 551. The terminals 550 and 551 may be personal computers, servers (e.g., web servers, database servers), or mobile communication devices (e.g., mobile phones, portable computing devices, on-board vehicle-based computing systems, and the like), and may include some or all of the elements described above with respect to the computing device 501. The network connections depicted in FIG. 5 include a local area network (LAN) 525 and a wide area network (WAN) 529, and a wireless telecommunications network 533, but may also include other networks. When used in a LAN networking environment, the computing device 501 may be connected to the LAN 525 through a network interface or adapter 523. When used in a WAN networking environment, the device 501 may include a modem 527 or other means for establishing communications over the WAN 529, such as network 531 (e.g., the Internet). When used in a wireless telecommunications network 533, the device 501 may include one or more transceivers, digital signal processors, and additional circuitry and software for communicating with wireless computing devices 540 (e.g., mobile phones, portable computing devices, on-board vehicle-based computing systems, etc.) via one or more network devices 535 (e.g., base transceiver stations) in the wireless network 533.

Also illustrated in FIG. 5 is a security and integration layer 560, through which communications may be sent and managed between the device 501 (e.g., a user's personal mobile device, a roadside assistance computing platform or server, etc.) and the remote devices (550 and 551) and remote networks (525, 529, and 533). The security and integration layer 560 may comprise one or more separate computing devices, such as web servers, authentication servers, and/or various networking components (e.g., firewalls, routers, gateways, load balancers, etc.), having some or all of the elements described above with respect to the computing device 501. As an example, a security and integration layer 560 of a mobile computing device, computing platform, or a server operated by an insurance provider, financial institution, governmental entity, or other organization, may comprise a set of web application servers configured to use secure protocols and to insulate the server 501 from external devices 550 and 551. In some cases, the security and integration layer 560 may correspond to a set of dedicated hardware and/or software operating at the same physical location and under the control of same entities as computing device 501. For example, layer 560 may correspond to one or more dedicated web servers and network hardware in an organizational datacenter or in a cloud infrastructure supporting a cloud-based data analysis system. In other examples, the security and integration layer 560 may correspond to separate hardware and software components which may be operated at a separate physical location and/or by a separate entity.

As discussed below, the data transferred to and from various devices in the computing system 500 may include secure and sensitive data, such as device usage data, application usage data, vehicle data, insurance claim data, and the like. Therefore, it may be desirable to protect transmissions of such data by using secure network protocols and encryption, and also to protect the integrity of the data when stored on in a database or other storage in a mobile device, roadside assistance computing platform or server and other computing devices in the system 500, by using the security and integration layer 560 to authenticate users and restrict access to unknown or unauthorized users. In various implementations, security and integration layer 560 may provide, for example, a file-based integration scheme or a service-based integration scheme for transmitting data between the various devices in a system 500. Data may be transmitted through the security and integration layer 560, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In other examples, one or more web services may be implemented within the various devices 501 in the system 500 and/or the security and integration layer 560. The web services may be accessed by authorized external devices and users to support input, extraction, and manipulation of the data (e.g., device usage data, location data, vehicle data, etc.) between the various devices 501 in the system 500. Web services built to support system 500 may be cross-domain and/or cross-platform, and may be built for enterprise use. Such web services may be developed in accordance with various web service standards, such as the Web Service Interoperability (WS-I) guidelines. In some examples, a web service may be implemented in the security and integration layer 560 using the Secure Sockets Layer (SSL) or Transport Layer Security (TLS) protocol to provide secure connections between servers 501 and various clients 550 and 551 (e.g., mobile devices, data analysis servers, roadside assistance computing platform, etc.). SSL or TLS may use HTTP or HTTPS to provide authentication and confidentiality. In other examples, such web services may be implemented using the WS-Security standard, which provides for secure SOAP messages using XML encryption. In still other examples, the security and integration layer 560 may include specialized hardware for providing secure web services. For example, secure network appliances in the security and integration layer 560 may include built-in features such as hardware-accelerated SSL and HTTPS, WS-Security, and firewalls. Such specialized hardware may be installed and configured in the security and integration layer 560 in front of the web servers, so that any external devices may communicate directly with the specialized hardware.

Although not shown in FIG. 5, various elements within memory 515 or other components in system 500, may include one or more caches, for example, CPU caches used by the processing unit 503, page caches used by the operating system 517, disk caches of a hard drive, and/or database caches used to cache content from database 521.

For embodiments including a CPU cache, the CPU cache may be used by one or more processors in the processing unit 503 to reduce memory latency and access time. In such examples, a processor 503 may retrieve data from or write data to the CPU cache rather than reading/writing to memory 515, which may improve the speed of these operations. In some examples, a database cache may be created in which certain data from a database 521 (e.g., internal data database, external data database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of performing functions describes herein.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 519 may be used by the various computing devices 501 within a roadside assistance control computing system 500 (e.g., software applications, etc.), including computer executable instructions for receiving roadside assistance requests, generating requests for additional information, generating user interfaces, and the like.

As discussed herein, aspects described relate to efficient and accurate systems for providing roadside assistance. For instance, as discussed herein, user interfaces generated based on features of a particular profile, user or partner may aid in pre-populating data, identifying necessary data, and the like. Further, enabling entry of information in any order may streamline the process and result in fewer inaccuracies and more efficient capture of information. Further, as discussed, the use of machine learning may aid in providing efficient and accurate instructions for providing roadside assistance.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASIC s), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. Furthermore, such aspects may take the form of a computer program product stored by one or more computer-readable storage media having computer-readable program code, or instructions, embodied in or on the storage media. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

The invention claimed is:

1. A computing platform, comprising:
a processing unit comprising a processor; and
a memory unit storing computer-executable instructions, which when executed by the processing unit, cause the computing platform to:
receive a request for roadside assistance;
identify, based on data from the request for roadside assistance, a partner entity;

identify, based on the identified partner entity, a profile of the partner entity;
generate an interactive user interface based on the identified profile, the interactive user interface including a first portion and a second portion, wherein at least one of: the first portion or the second portion includes pre-populated data associated with the request for roadside assistance, and wherein the first portion includes a plurality of selectable options, that are selectable in any order, for providing additional information related to the request for roadside assistance, the plurality of selectable options being generated based on the profile of the partner entity;
receive selection of a first option of the plurality of selectable options in the first portion of the interactive user interface;
identify, based on at least the first option, data for display in the second portion;
cause the identified data for display in the second portion to be displayed in the second portion of the interactive user interface;
generate, based on one or more machine learning datasets, a roadside assistance instruction; and
execute the roadside assistance instruction.

2. The computing platform of claim 1, wherein executing the roadside assistance instruction further includes dispatching a roadside assistance provider.

3. The computing platform of claim 1, further including instructions that, when executed, cause the computing platform to:
generate a first request for additional information;
transmit the generated first request to a computing device; and
receive response data in response to the transmitted first request.

4. The computing platform of claim 1, further including instructions that, when executed, cause the computing platform to:
identify a user associated with the request; and
wherein the partner entity is further identified based on the identified user by selecting the partner entity from a plurality of partner entities associated with the user.

5. The computing platform of claim 1, further including instructions that, when executed, cause the computing platform to:
receive additional information related to the request for roadside assistance, wherein generating the roadside assistance instruction is further based on the additional information.

6. The computing platform of claim 1, wherein the generated interactive user interface is unique to the profile.

7. The computing platform of claim 6, wherein the generated interactive user interface includes fields unique to the profile.

8. A method, comprising:
at a computing platform comprising at least one processor, memory, and a communication interface:
receiving, by the at least one processor and via the communication interface, a request for roadside assistance;
identifying, by the at least one processor and based on data from the request for roadside assistance, a partner entity;
identifying, by the at least one processor and based on the identified partner entity, a profile of the partner entity;
generating, by the at least one processor, an interactive user interface based on the identified profile, the interactive user interface including a first portion and a second portion, wherein at least one of: the first portion or the second portion includes pre-populated data associated with the request for roadside assistance, and wherein the first portion includes a plurality of selectable options, that are selectable in any order, for providing additional information related to the request for roadside assistance, the plurality of selectable options being generated based on the profile of the partner entity;
receiving, by the at least one processor, selection of a first option of the plurality of selectable options in the first portion of the interactive user interface;
identifying, by the at least one processor and based on at least the first option, data for display in the second portion;
causing, by the at least one processor, the identified data for display in the second portion to be displayed in the second portion of the interactive user interface;
generating, by the at least one processor and based on one or more machine learning datasets, a roadside assistance instruction; and
executing, by the at least one processor, the roadside assistance instruction.

9. The method of claim 8, wherein executing the roadside assistance instruction further includes dispatching a roadside assistance provider.

10. The method of claim 8, further including:
generating, by the at least one processor, a first request for additional information;
transmitting, by the at least one processor and via the communication interface, the generated first request to a computing device; and
receiving response data in response to the transmitted first request.

11. The method of claim 8, further including:
identifying, by the at least one processor, a user associated with the request; and
wherein the partner entity is further identified based on the identified user by selecting the partner entity from a plurality of partner entities associated with the user.

12. The method of claim 8, further including:
receiving, by the at least one processor, additional information related to the request for roadside assistance, wherein generating the roadside assistance instruction is further based on the additional information.

13. The method of claim 8, wherein the generated interactive user interface is unique to the profile.

14. The method of claim 13, wherein the generated interactive user interface includes fields unique to the profile.

15. One or more non-transitory computer-readable media storing instructions that, when executed by a computing platform comprising at least one processor, memory, and a communication interface, cause the computing platform to:
receive a request for roadside assistance;
identify, based on data from the request for roadside assistance, a partner entity;
identify, based on the identified partner entity, a profile of the partner entity;
generate an interactive user interface based on the identified profile, the interactive user interface including a first portion and a second portion, wherein at least one of: the first portion or the second portion includes pre-populated data associated with the request for roadside assistance, and wherein the first portion including a plurality of selectable options, that are selectable in any order, for providing additional information related to the request for roadside assistance, the plurality of selectable options being generated based on the profile of the partner entity;

receive selection of a first option of the plurality of selectable options in the first portion of the interactive user interface;

identify, based on at least the first option, data for display in the second portion;

cause the identified data for display in the second portion to be displayed in the second portion of the interactive user interface;

generate, based on one or more machine learning datasets, a roadside assistance instruction; and execute the roadside assistance instruction.

16. The one or more non-transitory computer-readable media of claim 15, wherein executing the roadside assistance instruction further includes dispatching a roadside assistance provider.

17. The one or more non-transitory computer-readable media of claim 15, further including instructions that, when executed, cause the computing platform to:

generate a first request for additional information;

transmit the generated first request to a computing device; and receiving response data in response to the transmitted first request.

18. The one or more non-transitory computer-readable media of claim 15, further including instructions that, when executed, cause the computing platform to:

identify a user associated with the request; and wherein the partner entity is further identified based on the identified user by selecting the partner entity from a plurality of partner entities associated with the user.

19. The one or more non-transitory computer-readable media of claim 15, further including instructions that, when executed, cause the computing platform to:

receive additional information related to the request for roadside assistance, wherein generating the roadside assistance instruction is further based on the additional information.

20. The one or more non-transitory computer-readable media of claim 15, wherein the generated interactive user interface is unique to the profile and wherein the generated interactive user interface includes fields unique to the profile.

* * * * *